March 11, 1958
T. STIGUM
2,826,404
VEHICLE BUNK AND SCALE
Filed Jan. 20, 1956
2 Sheets-Sheet 1
FIG. 1
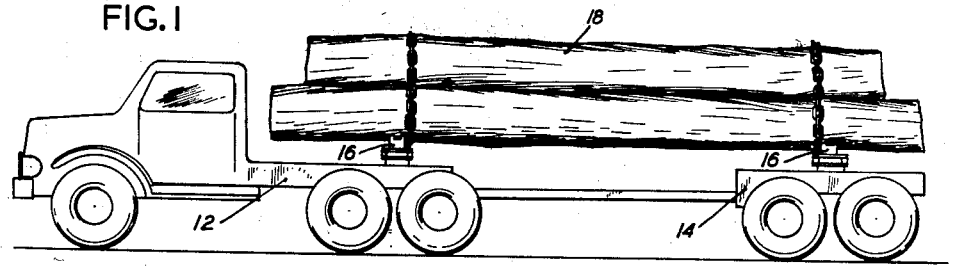
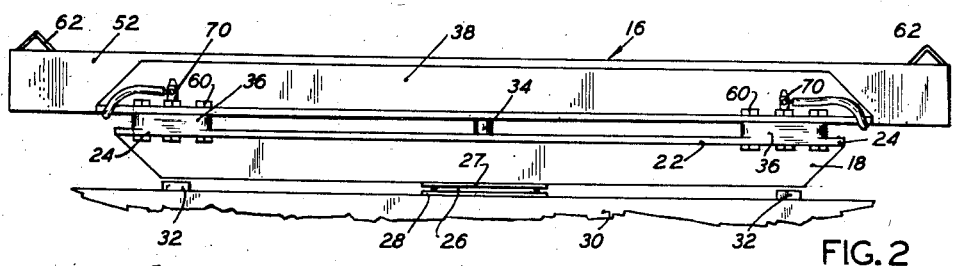
FIG. 2
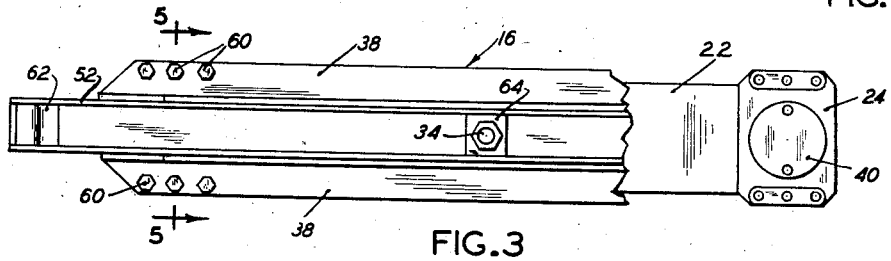
FIG. 3
FIG. 10
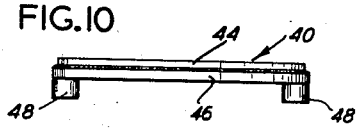
FIG. 7
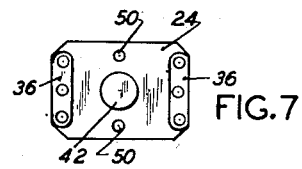
FIG. 8
FIG. 9
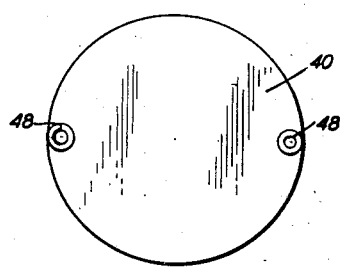
INVENTOR.
TOM STIGUM
BY
Buckhorn and Cheatham
ATTORNEYS March 11, 1958 — T. STIGUM — 2,826,404
VEHICLE BUNK AND SCALE
Filed Jan. 20, 1956 — 2 Sheets-Sheet 2

INVENTOR.
TOM STIGUM
BY Buckhorn and Cheatham
ATTORNEYS

United States Patent Office 2,826,404
Patented Mar. 11, 1958

2,826,404

VEHICLE BUNK AND SCALE

Tom Stigum, Portland, Oreg.

Application January 20, 1956, Serial No. 560,370

4 Claims. (Cl. 265—40)

This invention relates to a scale bunk and more particularly to a bunk for logging trucks or the like having hydraulic scale means forming part of the bunk so that the weight on the bunk or on a truck having a plurality of such bunks can be accurately determined.

It is many times desirable to determine the weight of logs or similar load upon a truck or upon a particular axle or group of wheels of a truck or trailer when no platform scale of sufficient capacity is available. Most states have weight limitations as to truck or axle loads which are rigidly enforced. The most economical operation frequently involves placing the maximum permitted load on the trucks, but when logs are loaded in the woods the trucks must usually be materially underloaded in order to avoid the risk run of having them overloaded. Even where log trucks are run on private roads, proper maintenance requires that certain upper load limits should not be exceeded.

Hydraulic scales for log trucks and the like have been proposed but such scales have either formed part of the pivotal connection between the bunk and its supporting bolster or have formed part of the bolster of the truck. Such arrangements have required extensive rebuilding of the truck itself and also have increased the vertical height of the bolster structure such that the bunks pivotally supported thereby have been unduly elevated. Maintenance and repair of such scales has been difficult since major disassembling of the truck structure has been necessary to remove or repair the hydraulic scale elements and associated elements.

In accordance with the present invention a hydraulic scale is incorporated into the structure of the bunk for receiving logs or other elongated material being hauled. The bunks of a logging truck or the like are ordinarily easily removable and replaceable and in order to convert a truck into one having a self-contained scale, in accordance with the present invention, it is merely necessary to remove the conventional bunks and substitute the bunks of the present invention. If any of the scale elements or other members of such bunk are damaged, the entire bunk can be easily and rapidly replaced. The scale bunk of the present invention is so constructed that the weight of the load thereon can be rapidly and accurately determined. Furthermore, the structure of the bunk is such that the scale elements as well as the load receiving elements may be easily removed and replaced, if damaged.

It is, therefore, an object of the invention to provide an improved device for determining the weight of the load upon log trucks or the like.

Another object of the invention is to provide an improved bunk for logging trucks or the like having a hydraulic scale forming part of the structure of the bunk for determining the weight upon such bunk.

Another object of the invention is to provide a bunk for logging trucks or the like which can be rapidly removed or replaced and which contains as part of the structure of the bunk a hydraulic scale mechanism.

A further object of the invention is to provide a scale bunk containing hydraulic scale elements and arranged such that such scale elements may easily be replaced.

Further object of the invention is to provide a scale bunk in which the load receiving and supporting elements, including the elements of a hydraulic scale mechanism, can be easily and rapidly replaced if damaged.

Other objects and advantages of the invention will appear in the following description of a preferred embodiment thereof illustrated in the attached drawings of which:

Fig. 1 is a side elevation of a logging truck showing the manner in which the scale bunks of the present invention are employed;

Fig. 2 is a side elevation of a scale bunk in accordance with the present invention on an enlarged scale showing a portion of the bolster supporting the scale bunk;

Fig. 3 is a plan view of the scale bunk of Fig. 2 with parts broken away;

Fig. 7 is a plan view of the lower pressure plate of Fig. 3;

Fig. 8 is a side elevation of the pressure plate of Fig. 7;

Fig. 9 is a bottom view on an enlarged scale of the hydraulic scale element; and Fig. 10 is a side elevation of the hydraulic scale element of Fig. 9.

Figure 4:
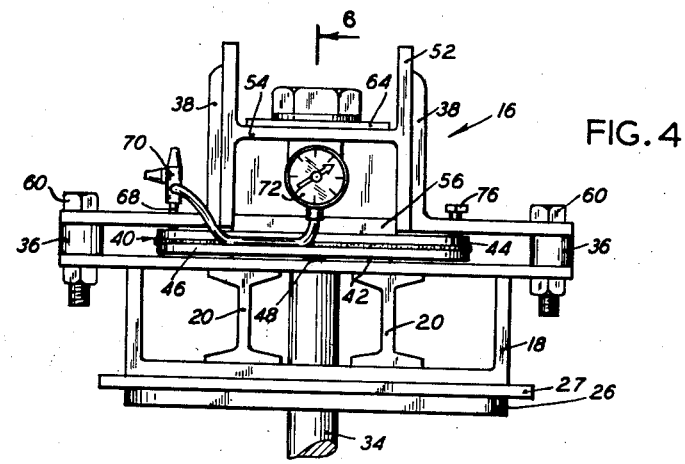
Fig. 4 is an end elevation of the scale bunk of Fig. 2 on a larger scale looking toward the right in Fig. 2.

Referring to Figure 1, a logging truck including a tractor 12 and semi-trailer 14 are shown as being each provided with scale bunks 16 of the present invention for receiving and supporting a load of logs 18. By employing a scale bunk 16 upon both the tractor 12 and the trailer 14, the entire weight of the load of logs can be determined but it will be apparent that a single scale bunk may be employed if it is desired to determine the weight upon only one group of wheels, for example, the rear tandem wheels of the tractor. It will also be apparent that the scale bunks of the present invention may be employed on trucks other than the tractor-trailer combinations shown.

Figure 5:
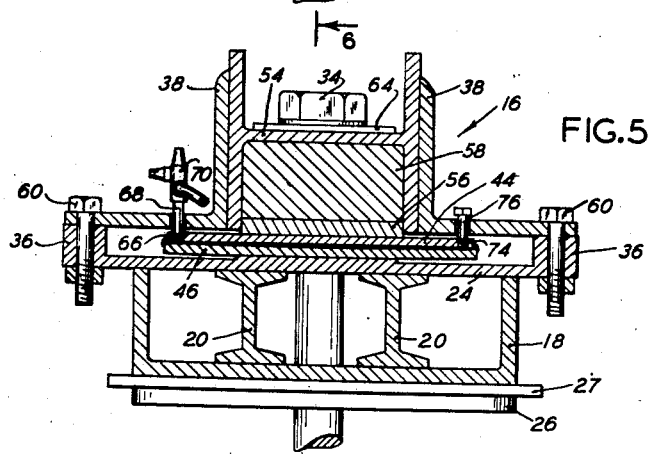
Fig. 5 is a vertical section on the same scale as Fig. 4 taken on the line 5—5 of Fig. 3.
Figure 6:
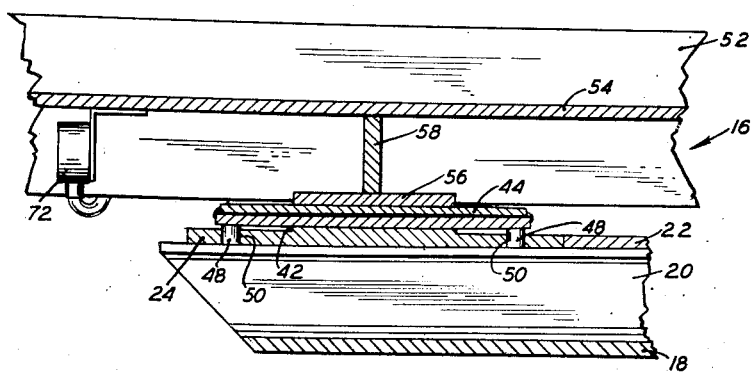
Fig. 6 is a partial vertical section taken on the line 6—6 of Fig. 4.

The scale bunk 16 of the present invention includes a lower substantially rigid supporting structure made up of a channel member 18 extending longitudinally of the bunk and having its channel opening upward (Figs. 4 and 5). A pair of I-beams 20 are positioned within the channel of the channel member 18 in spaced relation in respect to each other with their webs extending vertically and with their tops substantially flush with the upper edges of the upstanding sides of the channel member 18. The I-beam members 20 extend longitudinally of the bunk and act as stiffening members therefor. A top plate 22 covers the central portion of the channel member 18 and rests upon the tops of the I-beam members 20 and the upper edges of the sides of the channel member 18.

The ends of the channel member 18 are covered by lower pressure plates 24 having the form shown in Figs. 7 and 8, the lower pressure plates 24 also resting upon the top surfaces of the I-beam members 20 and the upper edges of the edge portions of the channel member 18. The channel member 18, I-beam members 20, cover plate 22 and lower pressure plates 24 are all securely welded together into a unitary structure forming a substantially rigid base portion for the log bunk, such base portion having a bearing plate 26 welded to a reinforcing plate 27, in turn welded to the central portion of the lower surface of the channel member 18. The bearing plate 26 rests upon a cooperating bearing plate 28 on the upper central portion of a bolster 30 forming part of the tractor 12 or of the trailer 14, the bolster 30 having wear plates 32 beneath the flat lower surface of the ends of the channel member 18. The bunk 16 of the present invention is pivotally secured to the bolster 30 by means of a king bolt 34 extending through suitable bearing apertures in the channel member 18, cover plate 22 and the bearing and reinforcing plates 26 and 27 to provide a pivotal connection between the bunk 16 and bolster 30.

The lower pressure plates 24 have end portions extending laterally of the channel member 18 beyond its edges, such end portions having upstanding spacer members 36 thereon for supporting the load receiving portion of the bunk 16. Such load receiving portions includes the angle members 38 and is described in more detail below. The spacer members 36 provide space above the lower pressure plates 24 for hydraulic scale pressure elements 40, such elements each having their lower surface resting upon an upstanding circular projection 42 on the upper surface of a pressure plate 24, the projections 42 being approximately one-half the diameter of the pressure elements. The pressure elements 40 are each made up of two flat circular metal plates 44 and 46 welded together at their peripheral edges. The upper plate 44 is preferably slightly smaller in diameter than the lower plate 46, the plates being of relatively heavy metal but having sufficient resiliency that their center portions can be forced apart a small amount by liquid under hydraulic pressure. The lower plate 46 is provided with a pair of dowels 48 extending perpendicularly to the lower surface thereof adjacent the periphery of the plate, the dowels being spaced 180 degrees apart on the plate. The dowels 48 are received in suitable apertures 50 in the lower pressure plate 24 so that the hydraulic scale pressure element 40 are held against lateral displacement upon the pressure plate 24 and are maintained concentric with and in position above the corresponding upstanding circular projections 42.

The load receiving portion of the bunk 16 includes an I-beam member 52 extending parallel to the channel member 18 of the base portion of the bunk between the vertical flanges of the angle members 38. The I-beam member 52 has its web positioned horizontally and the flanges extending vertically. The vertical flanges of the angle members 38 are welded at their edges to the outer vertical surfaces of the flanges of the I-beam member 52. Above each hydraulic scale pressure element 40 an upper pressure plate 56 is welded between the lower edges of the downwardly extending flanges of the I-beam member 52 so that the lower surface of such pressure plate projects somewhat below the lower edges of the I-beam flanges and below the horizontal flanges of the channel members 38. A reinforcing plate 58 extends transversely of the I-beam member 52 above and in contact with each upper pressure plate 56 and in contact with the web of the I-beam member. The lower surface of each of the upper pressure plates 56 is adapted to contact the central portion of the upper plate 44 of the corresponding hydraulic scale pressure element 40. The horizontal flanges of the angle members 38 have bolt receiving holes therein in alignment with similar bolt receiving holes in the spacer members 36 forming part of the lower pressure plates 24 so that the entire load receiving portion of the bunk including the angle members 38, I-beam member 52, pressure plates 56 and reinforcing plates 58, all of which are secured together by welding, can be detachably secured to the lower pressure plates 24 by means of the bolts 60.

It will be apparent that the horizontal flanges on the angle members 38 provide a resilient connection providing for vertical movement of the lower pressure plates 24, forming part of the base portion of the bunk, relative to the upper pressure plate 56 secured to the load receiving I-beam member 52. A load on the I-beam member 52 will thus cause such member to be depressed relative to the base portion of the bunk. Such depression of the I-beam member 52 will cause the upper pressure plates 56 carried thereby to be moved downwardly to compress the hydraulic pressure elements 40 between the upper pressure plates 56 and the lower pressure plates 24. The I-beam member 52 forming the load receiving member of the bunk 16 is shown as being provided with chocks 62 at its ends but it will be understood that such load receiving member may have any type of conventional load retaining elements at its ends, such as removable or pivoted stakes or the like. The pivot bolt or king pin 34 may extend upwardly through the web 54 of the I-beam member and have its head seated against a bearing plate 64 welded to the upper surface of the web 54.

The hydraulic pressure scale elements 40, as shown most clearly in Fig. 5, each has a threaded aperture 66 extending through the upper plate 44 thereof and into the interior of the element. The threaded aperture 66 receives the lower end of a pipe connection 68 having a fitting 70 on its upper end providing for connection to a pressure gauge 72. The fitting 70 also has provision for connection to a source of hydraulic liquid under pressure and includes means for establishing communication between said source and the interior of the corresponding scale element and for shutting off such communication. Such fittings are commercially obtainable and need not be further described. The pressure gauge 72 may be positioned in any convenient place, a desirable position being underneath the I-beam member 52 in the recess formed by the web 54 and flange members of the I-beam member. In this position the gauge 72 is protected from damage when loading and unloading the truck. The upper plate 44 of each hydraulic scale pressure element 40 may also be provided with a second threaded aperture 74 for receiving a plug 76, the threaded apertures 66 and 74 being preferably positioned adjacent each end of a diameter of the pressure element extending at right angles to the diameter through the dowels 48 on the lower plate 46 of the pressure element. The apertures 66 and 74 are thus positioned below the horizontal flanges of the angle members 38 and such flanges have suitable apertures therein so that the pipe connection 68 and plug 76 extend through and are accessible above such horizontal flanges.

In operation the base portion and load receiving portions as well as the hydraulic scale pressure elements are assembled into the position shown in Figures 1 to 6. A source of hydraulic liquid under pressure, for example, a container for such liquid provided with a hand pump is connected to the fittings 70 and with no load on the bunk, hydraulic liquid is forced into the hydraulic scale pressure element. By removing the plug 76 any small amount of air between the plates 44 and 46 can be bled therefrom after which the plug 76 is replaced and the hydraulic liquid then pumped into the pressure element until a predetermined pressure is reached. This pressure will vary with the diameter and thickness of the plates 44 and 46 as well as the maximum load for which the pressure element 10 is designed. It will usually fall within the range of 250 to 400 pounds per square inch and should be sufficient to force the centers of the two plates 44 and 46 a small distance apart, for example, a distance of the order of 1/100 of an inch to provide a liquid filled space between the plates. The gauge 72 may be calibrated to read zero load when this predetermined pressure is imposed on the gauge. The gauge 72 is preferably of the Bourdon tube type such that a slight change in the volume of the liquid filled space between the plates 44 and 46 can produce full scaled deflection on the gauge 72. A load placed upon the scale bunk will cause deflection of the indicator of the gauge 72 by pressing the plates 44 and 46 of the pressure element toward each other and the dial of the scale can be calibrated to read the imposed load. The diameter and thickness of the plates 44 and 46 can be varied for different size loads. As a specific example of a hydraulic scale pressure element for a large size log truck, the upper plate 44 may be 9¼ inches in diameter while the diameter of the lower plate 46 may be 9¾ inches, each plate having a thickness of 5/16 inch and being made of cold rolled steel. The difference in diameters of the plates provides for a ¼-inch welding groove around the periphery of the upper plate to enable the edges of the two plates to be welded together.

The scale bunk of the present invention has been found to be quite accurate, the total load on a given bunk being the sum of the reading of the two gauges attached to the two pressure elements thereof and the total load on the truck being the sum of the weight shown by all the gauges of the front and rear scale bunks. It will be noted that the weight shown by any given gauge is an indication of the weight of the load on the wheel or wheels supporting the truck or trailer adjacent end of the bunk provided with such gauge so that the total load on any given wheel can be readily calculated.

I claim:

1. A scale bunk for a vehicle comprising an elongated base portion adapted to be supported above and pivotally secured to a supporting member carried by said vehicle, an elongated load receiving portion extending above said base portion, flange members extending laterally of said load receiving portion, means for supporting said load receiving portions on said base portion adjacent the outer edges of said flange portions to provide for limited vertical movement of said load receiving portion relative to said base portion, and hydraulic scale means between said base portion and said load receiving portion for indicating the weight on said load receiving portion.

2. A scale bunk for a vehicle comprising an elongated base portion adapted to be supported above and pivotally secured at its center to a supporting member carried by said vehicle, an elongated load receiving portion positioned above said base portion, lower pressure plates extending laterally across the ends of said base portion, flange members extending laterally of said load receiving portion and attached at their outer edges to said lower pressure plates to provide for limited vertical movement of said load receiving portion relative to said base portion, upper pressure plates carried by said load receiving portion above said lower pressure plates, and hydraulic scale means having hydraulic pressure elements between said upper and lower pressure plates for indicating the weight on said load receiving portion.

3. A scale bunk for a vehicle comprising an elongated substantially rigid base portion adapted to be supported above and pivotally mounted at its central portion on a supporting member forming part of said vehicle, a load receiving portion having an elongated substantially rigid load receiving member extending parallel to said base portion and extending above said base portion, resilient means extending from the sides of said load receiving portion and secured to said base portion providing for limited vertical movement of said load receiving portion relative to said base portion, and hydraulic scale means adjacent each end of said base portion and between said base portion and said load receiving portion for indicating the load on said load receiving portion.

4. A scale bunk for a vehicle comprising an elongated base portion adapted to be supported above and pivotally secured to a supporting member carried by said vehicle, an elongated load receiving portion extending longitudinally of and above said base portion, said base portion extending laterally beyond the sides of said load receiving portion on each side thereof, said load receiving portion including an angle bar extending along each side thereof and overlying the laterally extending sides of said base portion, one leg of each of said angle members extending vertically and being secured to the load receiving portion only along its upper edge, the other leg of each of said angle members extending horizontally outward and being secured only along its outer edge to said base portion, and hydraulic scale means between said base portion and said load receiving portion for indicating the weight on said load receiving portion.

References Cited in the file of this patent

UNITED STATES PATENTS

| | | |
|---|---|---|
| 2,638,336 | Wetsel | May 12, 1953 |
| 2,646,272 | Swift | July 21, 1953 |
| 2,663,562 | Hendrickson | Dec. 22, 1953 |
| 2,704,661 | Maugh | Mar. 22, 1955 |